United States Patent
Lee et al.

(10) Patent No.: US 11,639,917 B2
(45) Date of Patent: May 2, 2023

(54) DIANHYDRIDE ANALYSIS METHOD

(71) Applicant: LG Chem, Ltd., Seoul (KR)

(72) Inventors: Joon Seok Lee, Daejeon (KR); So Yeon Kim, Daejeon (KR); Bumgyu Choi, Daejeon (KR); Byoung Hyoun Kim, Daejeon (KR)

(73) Assignee: LG Chem, Ltd.

( * ) Notice: Subject to any disclaimer, the term of this patent is extended or adjusted under 35 U.S.C. 154(b) by 255 days.

(21) Appl. No.: 16/959,489

(22) PCT Filed: Sep. 23, 2019

(86) PCT No.: PCT/KR2019/012234
§ 371 (c)(1),
(2) Date: Jul. 1, 2020

(87) PCT Pub. No.: WO2020/067680
PCT Pub. Date: Apr. 2, 2020

(65) Prior Publication Data
US 2021/0072200 A1   Mar. 11, 2021

(30) Foreign Application Priority Data

Sep. 27, 2018 (KR) .................. 10-2018-0114783
Sep. 20, 2019 (KR) .................. 10-2019-0115730

(51) Int. Cl.
*G01N 30/34* (2006.01)
*G01N 30/36* (2006.01)
(Continued)

(52) U.S. Cl.
CPC ............. *G01N 30/34* (2013.01); *G01N 30/36* (2013.01); *G01N 30/64* (2013.01); *G01N 30/74* (2013.01)

(58) Field of Classification Search
CPC ........ G01N 30/34; G01N 30/36; G01N 30/64; G01N 30/74
(Continued)

(56) References Cited

U.S. PATENT DOCUMENTS 4,487,911 A * 12/1984 Lange ................ C08G 73/1028
528/229
6,084,109 A * 7/2000 Chu ........................ B01J 23/888
549/239
(Continued)

FOREIGN PATENT DOCUMENTS

CN   101013113 A   8/2007
CN   101068799 A   11/2007
(Continued)

OTHER PUBLICATIONS

Roberts, G. D. et al, Journal of Applied Polymer Science 1987, 33, 2893-2913.*
(Continued)

*Primary Examiner* — Arlen Soderquist
(74) *Attorney, Agent, or Firm* — Lerner David LLP

(57) ABSTRACT

The present invention relates to a dianhydride analysis method, which can reliably analyze a dianhydride having high reactivity and low solubility. In addition, the present invention can analyze the structure of impurities by separating the impurities on the basis of having a similar retention time in HPLC analysis, and can analyze the purity of the dianhydride with or without chromophores.

5 Claims, 8 Drawing Sheets

(51) Int. Cl.
*G01N 30/74* (2006.01)
*G01N 30/64* (2006.01)

(58) Field of Classification Search
USPC .......................................................... 436/93
See application file for complete search history.

(56) References Cited

U.S. PATENT DOCUMENTS

| | | | |
|---|---|---|---|
| 2007/0123716 | A1 | 5/2007 | Okoshi |
| 2008/0119660 | A1* | 5/2008 | Khouri ................. C07D 307/89 548/513 |
| 2008/0281073 | A1 | 11/2008 | Nagayama et al. |
| 2011/0306146 | A1 | 12/2011 | Sidhu et al. |
| 2016/0032056 | A1* | 2/2016 | Takasawa ......... H01L 31/03926 528/346 |
| 2017/0129908 | A1 | 5/2017 | Rekken et al. |
| 2021/0072203 | A1* | 3/2021 | Kim ....................... G01N 30/60 |

FOREIGN PATENT DOCUMENTS

| | | |
|---|---|---|
| CN | 103969392 A | 8/2014 |
| CN | 104535706 A | 4/2015 |
| CN | 105954419 A | 9/2016 |
| CN | 106458825 A | 2/2017 |
| JP | 2006214819 A | 8/2006 |
| JP | 2017524728 A | 8/2017 |
| KR | 20060123168 A | 12/2006 |
| WO | 2011061545 A1 | 5/2011 |
| WO | 2017163894 A1 | 9/2017 |

OTHER PUBLICATIONS

Schwartz, W. T., High Performance Polymers 1990, 2, 189-196.*
Patterson, S. D. et al., High Performance Polymers 1990, 2, 197-207.*
Mori, H. et al., JFE technical Report 2005, 54-61, downloaded from https://www.jfe-steel.co.jp/en/research/report/006/pdf/006-12.pdf.*
Patterson, et al., Analysis of Anhydrides Using HPLC, High Performance Polymers, 1990, pp. 197-207, vol. 2, No. 3.
International Search Report for Application No. PCT/KR2019/012234, dated Jan. 16, 2020, pp. 1-2.
Li, Hong-Xia et al. "Separation and identification of the phthalic anhydride derivatives of Liqusticum Chuanxiong Hort by GC-MS, TLC, HPLC-DAD, and HPLC-MS." Journal of chromatographic science vol. 40,(Mar. 3, 2002): pp. 156-161.
Feng, G., et al., "Preparation of Bisphenol A Dieter Dianhydride", vol. 33, No. 7, (Jul. 2010) pp. 9-11, abstract only.
Search Report dated Aug. 12, 2022 from Office Action for Chinese Application No. 201980010109.4 dated Aug. 22, 2022. 4 pgs.

* cited by examiner

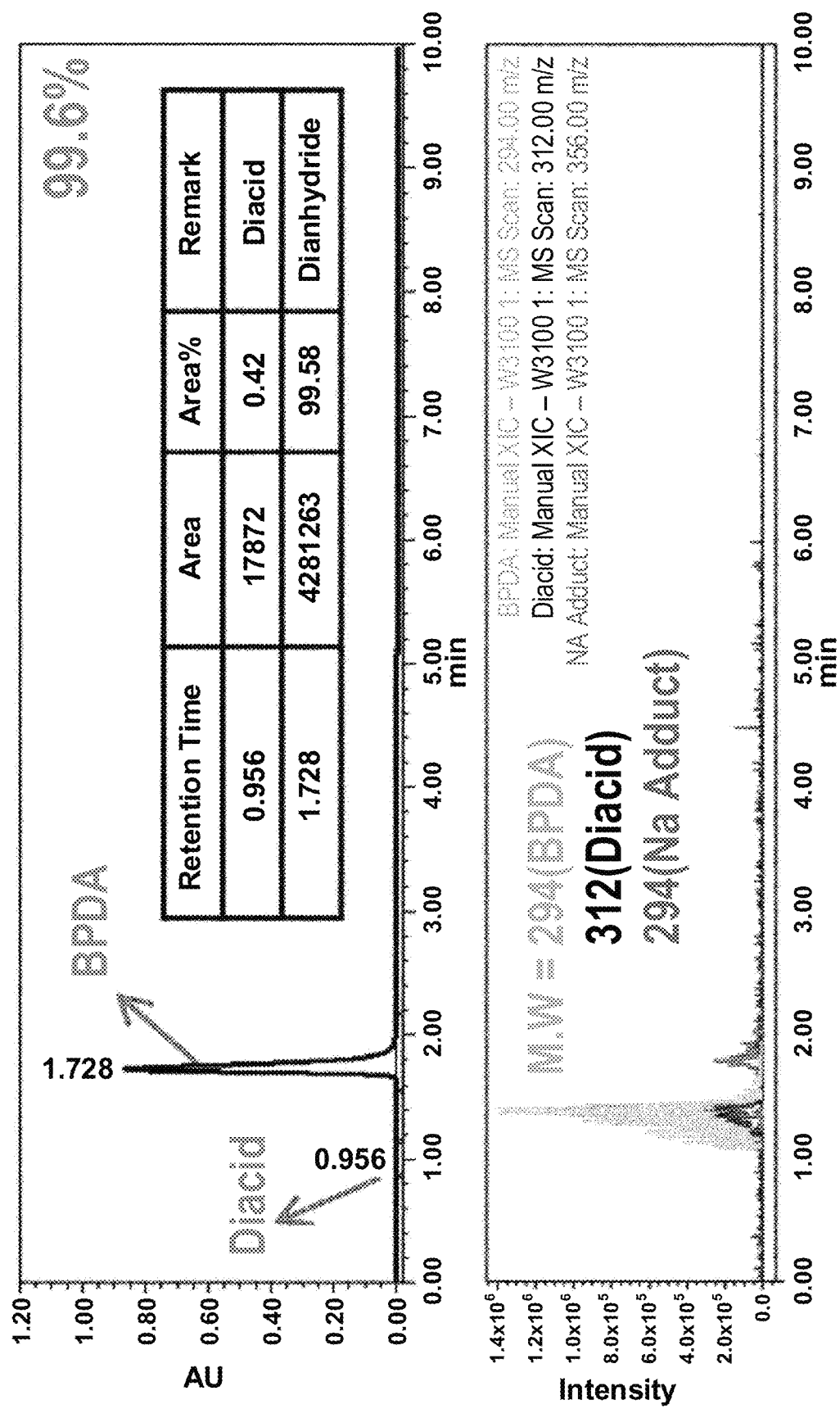
[Fig. 1]

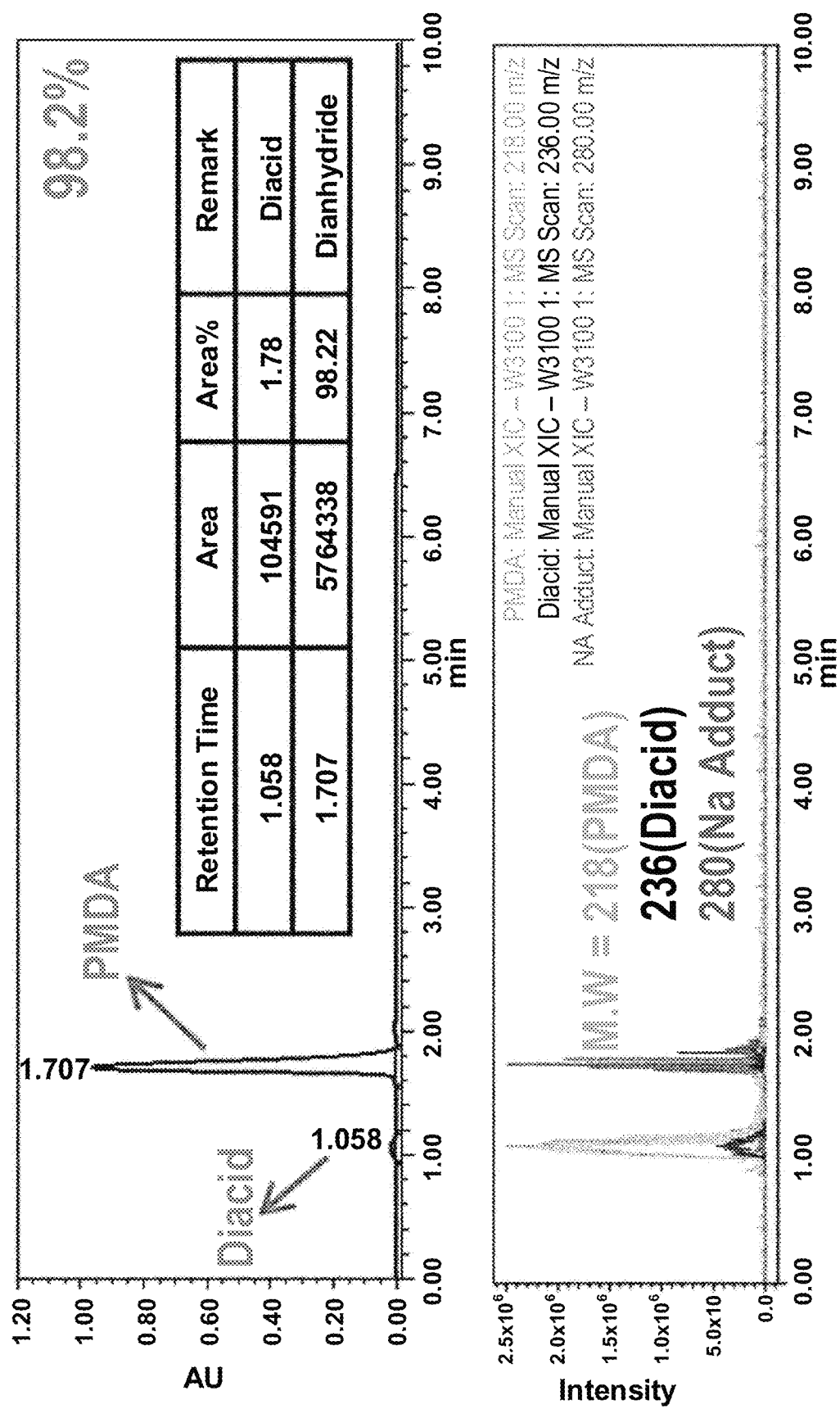
[Fig. 2]

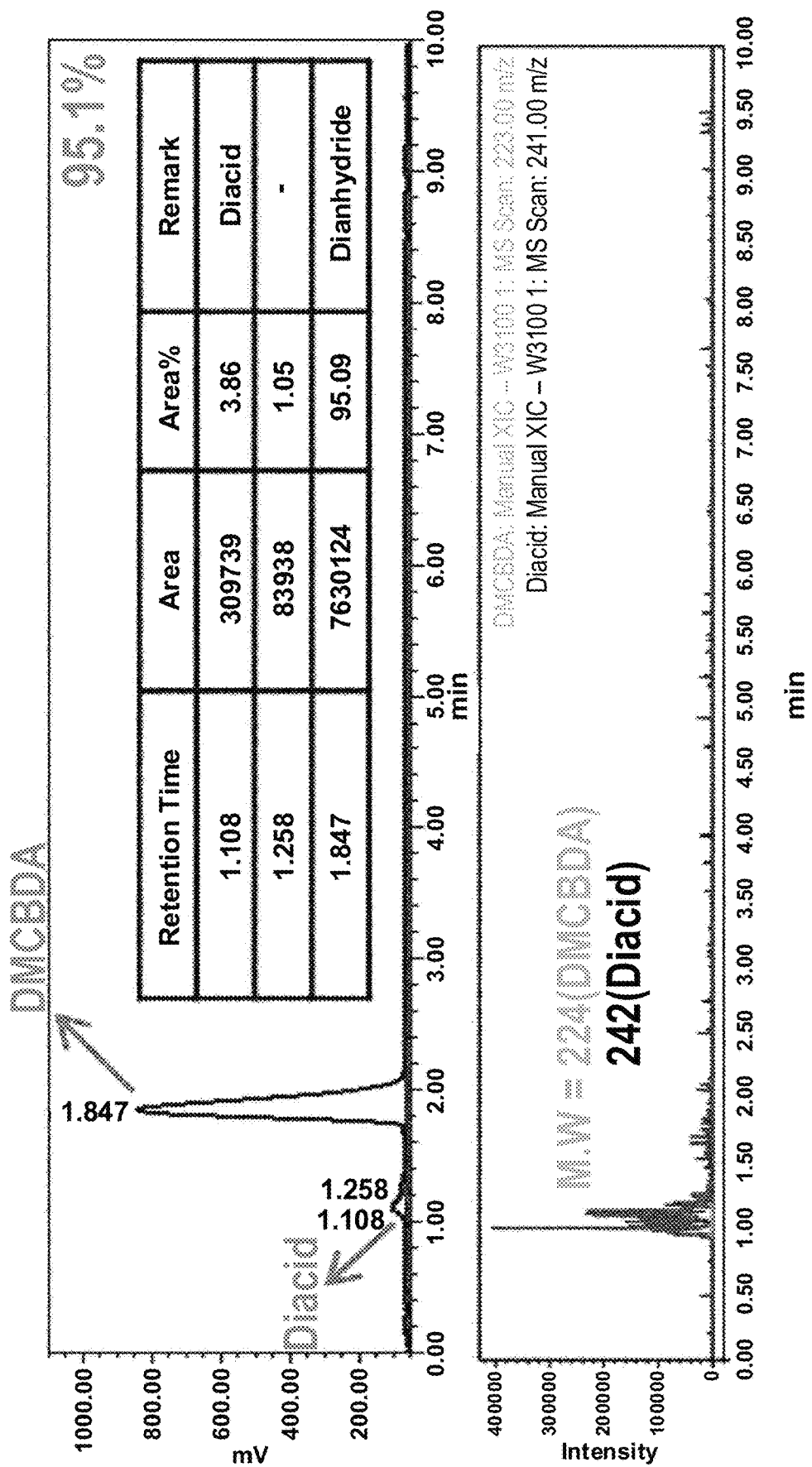
[Fig. 3]

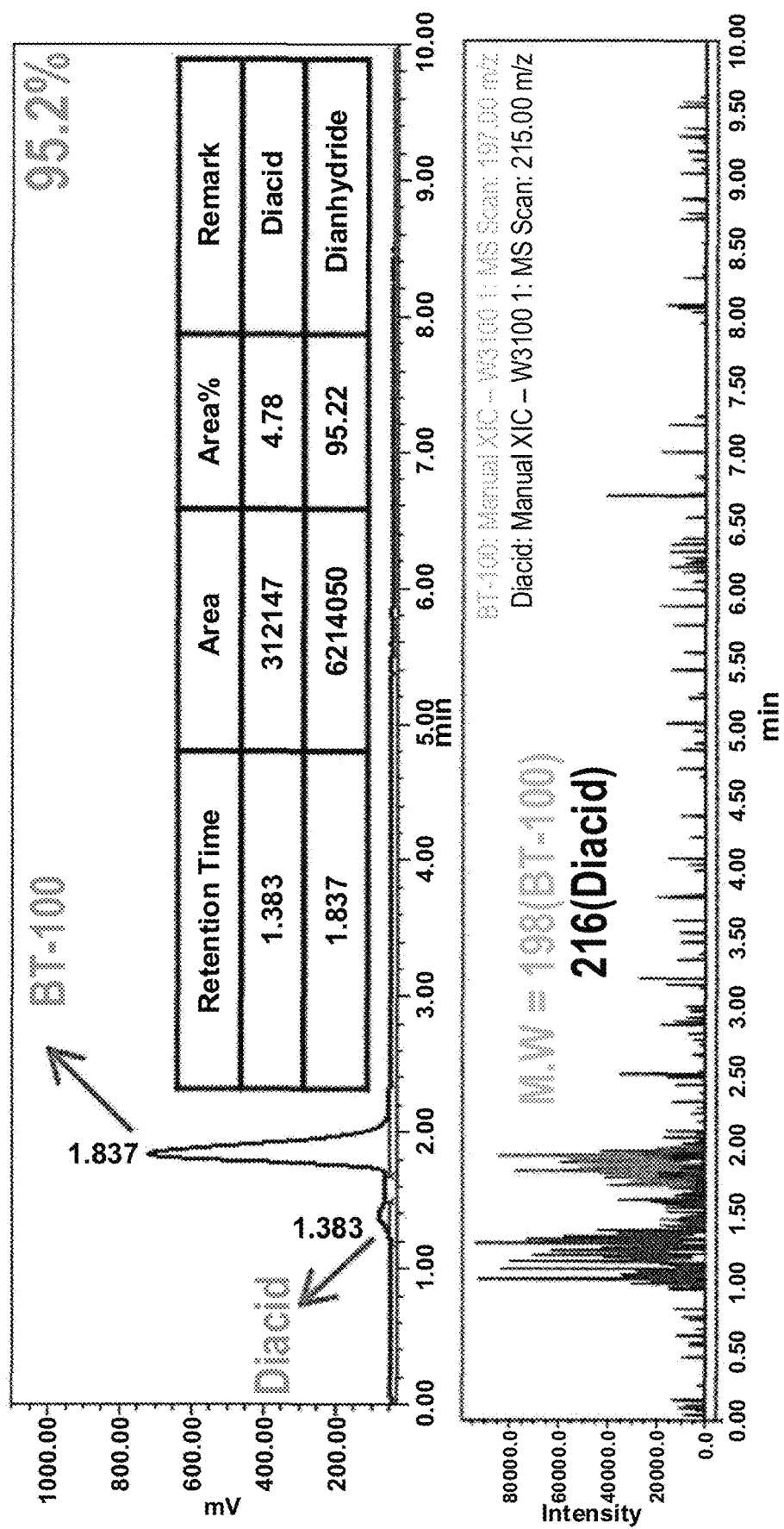
[Fig. 4]

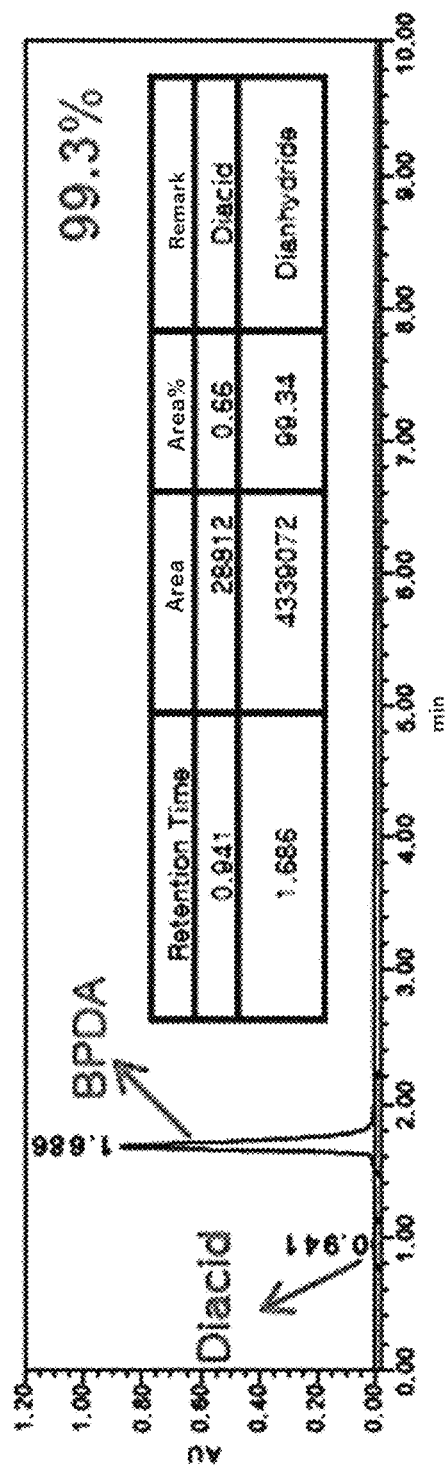
[Fig. 5]

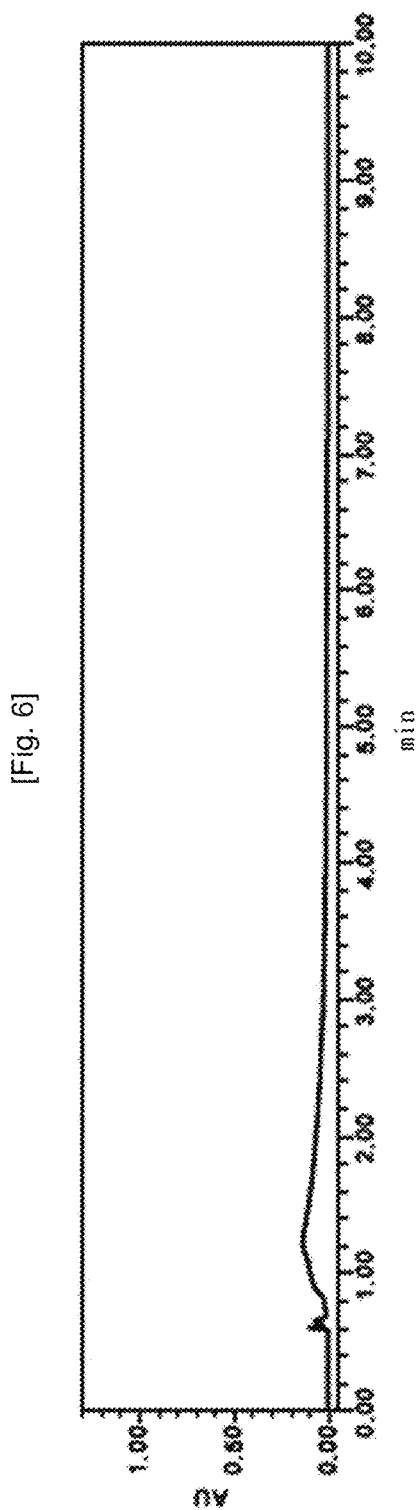
[Fig. 6]

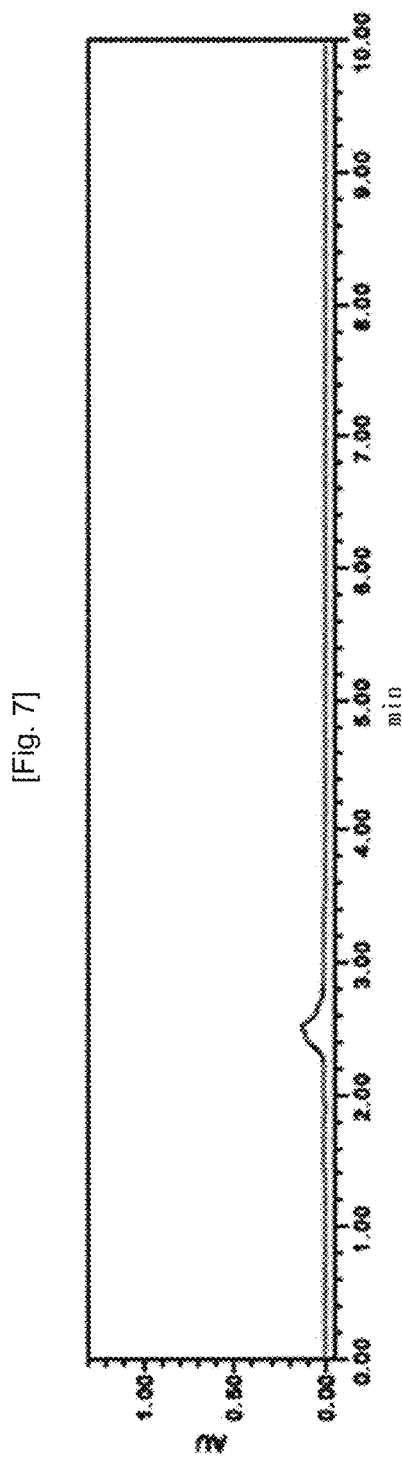

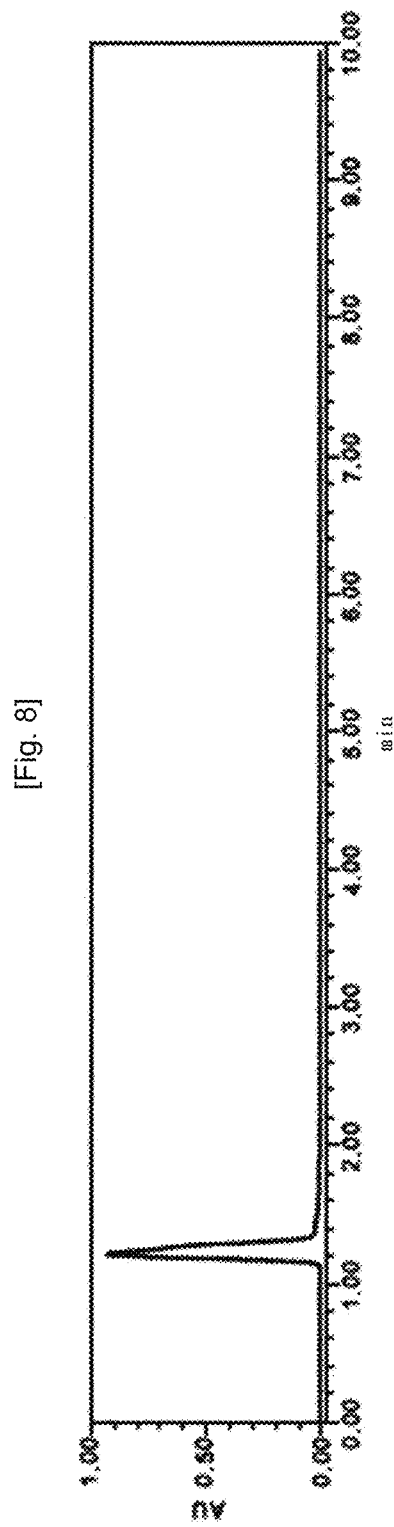
[Fig. 8]

DIANHYDRIDE ANALYSIS METHOD

CROSS-REFERENCE TO RELATED APPLICATIONS

The present application is a national phase entry under 35 U.S.C. § 371 of International Application No. PCT/KR2019/012234 filed on Sep. 23, 2019, which claims priority to Korean Patent Application Nos. 10-2018-0114783, filed on Sep. 27, 2018 and Korean Patent Application No. 10-2019-0115730, filed on Sep. 20, 2019, the entire disclosures of which are incorporated herein by reference.

BACKGROUND OF THE INVENTION

1. Field of the Invention

The present invention relates to an analysis method for dianhydride.

2. Description of the Related Art

In order to analyze dianhydride, a method such as titration is generally used. However, the titration method has difficulty in quantifying dianhydride because the titration endpoint is disturbed in case that the acid generated by interconversion of the dianhydride has high acidity. In addition, it has a problem that the acidity of the generated acid varies depending on the type of anhydride, so that the suitability of quantification varies at the time of titration. In addition, there are problems that it is difficult to find the acidity information of the converted acid in the case of analyzing anhydride having a new structure by titration method and it is difficult to quantitatively analyze by titration method when the compound is mixed with acid or base compound.

In addition, during the process of analyzing the purity of highly reactive dianhydrides, such conventional methods are difficult to determine accurate purity of dianhydride compounds since the ring structure is opened due to the influence of external environment such as heat or moisture. Due to the planar structural properties of dianhydride compounds, there is a disadvantage that the interaction with the column is low so that the compounds do not sufficiently stay in the column.

Therefore, there is a need for a reliable assay for analyzing the purity of highly reactive dianhydrides. There is also a need for a method for separating impurities having retention time similar to those of dianhydrides and analyzing the structure thereof.

SUMMARY OF THE INVENTION

It is an object of the present invention to provide a method for analyzing purity of dianhydrides.

In addition, it is other object of the present invention is to provide a method for separating impurities contained in the dianhydrides and analyzing the structure thereof.

In order to achieve the above object, the present invention provides an analysis method for dianhydride by HPLC (high performance liquid chromatography), wherein an anhydrous compound is used as a mobile phase and a cyano column is used as a stationary phase.

According to one embodiment, the anhydrous compound may comprise at least one selected from the group consisting of anhydrous acetonitrile (ACN), anhydrous dimethylformamide (DMF), acetic anhydride, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone, anhydrous tetrachloroethane, anhydrous tetrahydrofuran, anhydrous toluene and anhydrous trichloroethane, in particular a combination of anhydrous acetonitrile (ACN) and anhydrous dimethylformamide (DMF).

According to one embodiment, the elution condition of the mobile phase may be a concentration gradient of 20% ACN and 80% DMF at 0 minute and 60% ACN and 40% DMF at 10 minutes from the start of the analysis.

According to one embodiment, the dianhydride may comprise at least one selected from the group consisting of 4,4'-biphthalic dianhydride (BPDA), pyromellitic dianhydride (PMDA), 1,3-dimethylcyclobutane-1,2,3,4-tetracarboxylic dianhydride (DMCBDA) and 1,2,3,4-butane tetracarboxylic dianhydride (BT-100).

According to one embodiment, for the detection in the HPLC analysis, a photodiode array detector may be used in the case of the presence of chromophores and a charged aerosol detector may be used in the case of the absence of chromophores.

According to one embodiment, the dianhydride may be injected into the column in the form of a solution dissolved in a solvent, wherein the solvent may comprise anhydrous acetonitrile (ACN), anhydrous dimethylformamide (DMF) or a combination thereof.

In addition, the present invention provides a system for applying the analysis method.

EFFECT OF THE INVENTION

The present invention can reliably analyze dianhydride having high reactivity and low solubility. In addition, it is possible to separate diacid impurities having a similar retention time and to analyze the structure of the impurities in the HPLC analysis, and it is possible to analyze the purity of dianhydride with or without chromophores.

BRIEF DESCRIPTION OF THE DRAWINGS

FIG. 1 is a graph showing the analysis results according to Example 1.

FIG. 2 is a graph showing the analysis results according to Example 2.

FIG. 3 is a graph showing the analysis results according to Example 3.

FIG. 4 is a graph showing the analysis results according to Example 4.

FIG. 5 is a graph showing the analysis results according to Comparative Example 1.

FIG. 6 is a graph showing the analysis results according to Comparative Example 2.

FIG. 7 is a graph showing the analysis results according to Comparative Example 3.

FIG. 8 is a graph showing the analysis results according to Comparative Example 4.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The term "addition" as used herein may be described interchangeably with "feeding, inflow, injection", and may be understood to mean flowing or putting solid, liquid, gas or heat, etc. into the places in a need thereof.

Hereinafter, the analysis method for dianhydrides according to the embodiment of the present invention will be described in more detail.

The dianhydride has high reactivity, such that its ring structure can be easily opened. The diacid compounds which have the opened ring structure due to the reaction of the dianhydride are impurities that are difficult to separate because the retention time is similar to the dianhydride when analyzed by chromatography.

In order to solve the above problems, the present invention provides an analysis method for dianhydride by HPLC (high performance liquid chromatography), wherein an anhydrous compound is used as a mobile phase and a cyano column is used as a stationary phase.

The dianhydride may be a compound having a water content of 0.02% or less or 0.001% or less.

In the analysis method for dianhydride according to the present invention, it is possible to minimize the phenomenon that the trace amount of water contained in the solvent forms diacid and affects the purity, by using an anhydrous compound as the HPLC mobile phase. An example showing a process in which the water contained in the solvent reacts with the dianhydride compound to form impurity in the diacid form is shown in structural formula 1.

Structural Example 1

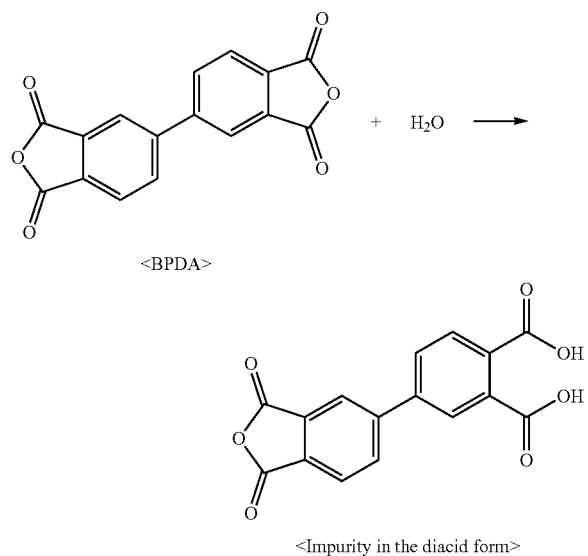

According to one embodiment, the anhydrous compound may comprise at least one selected from the group consisting of anhydrous acetonitrile (ACN), anhydrous dimethylformamide (DMF), acetic anhydride, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone, anhydrous tetrachloroethane, anhydrous tetrahydrofuran, anhydrous toluene and anhydrous trichloroethane, in particular a combination of anhydrous acetonitrile (ACN) and anhydrous dimethylformamide (DMF).

In particular, the combination of anhydrous ACN and anhydrous DMF is advantageous for separating the diacid which is the impurity of the dianhydride. Because dianhydrides have low solubility in organic solvents due to their chemical structure, it is often difficult to analysis by HPLC. Anhydrous DMF is generally a solvent that can dissolve dianhydrides, and when applied together with other solvent, it is possible to more efficiently separate diacid impurities.

According to one embodiment, the elution condition of the mobile phase may be a concentration gradient of 20% ACN and 80% DMF at 0 minute and 60% ACN and 40% DMF at 10 minutes from the start of the analysis.

In addition, in the present invention, a cyano column may be used as an HPLC analysis column, and examples thereof include Capcellpak Cyano, hypersil Gold™ cyano, Hypersil™ CPS-2 cyano, Phenomenex soloctosil cyano, MIC-TOSORB™ SHORT-ONE cyano, and LiChrosorb cyano and the like. In addition, the conditions of the column may be 4.6 mm ID×150 mm L and 3 µm particle size.

The cyano (CN) column, in which chloro(3-cyanopropyl) dimethyl silane is reacted with a silica gel to adsorb a —CN group, has a structural formula Si—$CH_2CH_2CH_2CN$ and exhibits weak polarity, and thus it may be selectively used by using normal phase or reversed phase of a polar sample. In addition, it maintains a rapid equilibrium with the solvent composition in the column, which is advantageous for gradient elution, and can be used for separation of ionic or basic substances. In addition, the column has less adsorption of contaminants than the silica column, resulting in longer life and less sensitivity to water.

In one embodiment, the dianhydride may comprise at least one selected from the group consisting of 4,4'-biphthalic dianhydride (BPDA), pyromellitic dianhydride (PMDA), 1,3-dimethylcyclobutane-1,2,3,4-tetracarboxylic dianhydride (DMCBDA), 1,2,3,4-butane tetracarboxylic dianhydride (BT-100), 3,3',4,4'-diphenyl sulfone tetracarboxylic dianhydride, 1,2,4,5-cyclohexane tetracarboxylic dianhydride, 1,2,3,4-cyclopentane tetracarboxylic dianhydride, diethylene triamine penta acetic dianhydride and 1,2,3,4-cyclobutanetetracarboxylic dianhydride.

In one embodiment, the dianhydride, a sample for HPLC analysis, is injected into the column in the form of a solution dissolved in a solvent, wherein the solvent for dissolving the dianhydride may be at least one selected from the group consisting of anhydrous dimethylformamide (DMF), anhydrous acetonitrile (ACN), acetic anhydride, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone, anhydrous tetrachloroethane, anhydrous tetrahydrofuran, anhydrous toluene and anhydrous trichloroethane. For example, anhydrous DMF can dissolve both of dianhydrides having low solubility and impurities, facilitating chromatographic analysis. A general compound can also be used as a solvent, but dianhydride may be converted to diacid by moisture in the compound, resulting in lower purity than actual purity.

According to one embodiment, for the detection in the HPLC analysis, a photodiode array detector is used in the case of the presence of chromophores and a charged aerosol detector is used in the case of the absence of chromophores.

The present invention can also analyze the purity of dianhydride by providing a system for applying the above analysis method and can easily perform separation and structure analysis of the contained impurities.

According to the present invention as described above, the purity of dianhydride can be analyzed, and the high purity dianhydride selected via this analysis can be usefully used as a component for preparing polyamic acid or polyimide. Furthermore, the high purity dianhydride may be applied to various fields such as a transparent substrate, a semiconductor substrate, a substrate for a flexible display, an alignment layer, a plasticizer, and the like.

Hereinafter, embodiments of the present invention will be described in detail so that those skilled in the art can easily carry out the present invention. The present invention may, however, be embodied in many different forms and should not be construed as limited to the embodiments set forth herein.

HPLC conditions applied for analysis of dianhydride in the following examples are as follows.

1. Mobile Phase

Anhydrous acetonitrile (ACN) and anhydrous dimethylformamide (DMF) are used in the eluent conditions shown in Table 1.

TABLE 1

| Time (min) | ACN(%) | DMF(%) |
|---|---|---|
| 0 | 20 | 80 |
| 10 | 60 | 40 |
| 10.01 | 20 | 80 |

2. Column

Capcellpak Cyano column (Dimension of 4.6 mm ID×150 mm L, 3 μm Particle size, at 40° C.)

3. Detector

For dianhydride in the present of chromophores, a photodiode array detector (295 nm) is used, and for dianhydride in the absence of chromophores, a charged aerosol detector is used.

4. Mass Detector

Mode APCI±, APCI Corona 1.5 kV, Cone 30V, Source Temperature 150° C., APCI Probe Temperature 450° C., Con Gas Flow 50 L/hr, Desolvation Gas Flow 500 L/hr.

Example 1: 4,4'-Biphthalic Dianhydride (BPDA)

HPLC analysis was performed using Waters HPLC system (e2695 Separations Module, 2998 Photodiode Array Detector, 3100 Mass Detector). As a column of the stationary phase, Capcellpak Cyano (4.6 mm ID×150 mm L, Particle Size: 3 μm) of Shiseido was used at 40° C. The mobile phase was anhydrous acetonitrile (ACN, anhydrous, Sigma Aldrich) and anhydrous dimethylformamide (DMF, anhydrous, Sigma Aldrich), which are degassed, and gradient conditions are ACN/DMF from 20/80 (v/v) to 60/40 (v/v) for 10 minutes at 1 mL/min. 2 μL of a solution obtained by completely dissolving BPDA in anhydrous DMF at a concentration of 1 mg/mL was injected into the HPLC system and eluted through a column, and then chromatograms were obtained using a photodiode array detector. The detection wavelength is 295 nm, the mass detector mode is APCI±, APCI Corona is 1.5 kV, Cone is 30V, Source Temperature is 150° C., APCI Probe Temperature is 450° C., Con Gas Flow is 50 L/hr, Desolvation Gas Flow is 500 L/hr. As a result, the purity of the BPDA sample was found to be 99.6%, and the results of analyzing the purity and the structure of the impurities are shown in FIG. 1.

Example 2: Pyromellitic Dianhydride (PMDA)

HPLC analysis was performed in the same manner as in Example 1, except that 10 μL of a solution obtained by completely dissolving PMDA in anhydrous ACN at a concentration of 1 mg/mL was used.

The purity of the PMDA sample was found to be 98.2%, and the results of analyzing the purity and the structure of the impurities are shown in FIG. 2.

Example 3: 1,3-Dimethyl Cyclobutane-1,2,3,4-Tetracarboxylic Dianhydride (DMCBDA)

HPLC analysis was performed using Waters HPLC system (e2695 Separations Module) and a charged aerosol detector (CAD) of ThermoFisher. As a column, Capcellpak Cyano (4.6 mm ID×150 mm L, Particle Size: 3 μm) of Shiseido was used at 40° C. The mobile phase was anhydrous acetonitrile (ACN, anhydrous, Sigma Aldrich) and anhydrous dimethylformamide (DMF, anhydrous, Sigma Aldrich), which are degassed, and a gradient condition is ACN/DMF from 20/80 (v/v) to 60/40 (v/v) for 10 minutes at 1 mL/min. 5 μL of a solution obtained by completely dissolving DMCBDA in anhydrous DMF at a concentration of 1 mg/mL was injected into the HPLC system and eluted through a column, and then chromatograms were obtained using a charged aerosol detector. The mass detector mode is APCI±, APCI Corona is 1.5 kV, Cone is 30V, Source Temperature is 150° C., APCI Probe Temperature is 450° C., Con Gas Flow is 50 L/hr, Desolvation Gas Flow is 500 L/hr. As a result, the purity of the DMCBDA sample was found to be 95.1%, and the results of analyzing the purity and the structure of the impurities are shown in FIG. 3.

Example 4: 1,2,3,4-Butane Tetracarboxylic Dianhydride (BT-100)

HPLC analysis was performed in the same manner as in Example 3, except that 5 μL of a solution obtained by completely dissolving BT-100 in anhydrous DMF at a concentration of 1 mg/mL was used.

The purity of the BT-100 sample was found to be 95.2%, and the results of analyzing the purity and the structure of the impurities are shown in FIG. 4.

Comparative Example 1: 4,4'-Biphthalic Dianhydride (BPDA)

HPLC analysis was performed in the same manner as in Example 1 except that ACN and DMF as a general solvent for HPLC were used instead of the anhydrous compound as the mobile phase.

The purity of the BPDA sample was found to be 99.3%, and the results are shown in FIG. 5.

From FIG. 5, it can be seen that the purity difference from the purity of Example 1 for the same substance was about 0.3%, which is interpreted that as a minor amount of water contained in the solvent for HPLC used in Comparative Example 1 reacted with BPDA to from diacid, the purity was affected.

Comparative Example 2: 4,4'-Biphthalic Dianhydride (BPDA)

HPLC analysis was performed in the same manner as in Example 1 except that Capcellpak Cyano (4.6 mm ID×150 mm L, Particle Size: 3 μm) of Shiseido was used as an HPLC column. The results are shown in FIG. 6.

From FIG. 6, when using a C18 column instead of the cyano column, it can be seen that the lack of interaction with the column results in wide peaks rather than sharp peaks.

Comparative Example 3: 4,4'-Biphthalic Dianhydride (BPDA)

HPLC analysis was performed in the same manner as in Example 1 except that Acclaim Surfactant (4.6 mm ID×50 mm L, Particle Size: 5 μm) of Thermo Fisher was used as an HPLC column. The results are shown in FIG. 7.

From FIG. 7, when using Acclaim Surfactant column instead of using the cyano column, it can be seen that the wide peaks appear and the resolution is greatly reduced.

Comparative Example 4: 4,4'-Biphthalic Dianhydride (BPDA)

HPLC analysis was performed in the same manner as in Example 1 except that chloroform was used instead of the anhydrous ACN as the mobile phase. The results are shown in FIG. 8.

As shown in FIG. 8, when using chloroform, impurities such as diacid and dianhydride compounds such as BPDA have a similar retention time, and it is found that peaks are not separated on the graph.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. An analysis method for dianhydride by HPLC (high performance liquid chromatography), comprising:
    injecting a mobile phase comprising an anhydrous compound and a dianhydride sample into a column;
    eluting the mobile phase through the column; and
    analyzing the dianhydride sample using a detector,
    wherein the column comprises a stationary phase which is a cyano column,
    wherein the mobile phase is a combination of anhydrous acetonitrile (ACN) and anhydrous dimethylformamide (DMF) and an elution condition of the mobile phase is a concentration gradient of 20% ACN and 80% DMF at 0 minute and 60% ACN and 40% DMF at 10 minutes from the start of the analysis.

2. The analysis method for dianhydride according to claim 1, wherein the dianhydride comprises at least one of 4,4'-biphthalic dianhydride (BPDA), pyromellitic dianhydride (PMDA), 1,3-dimethylcyclobutane-1,2,3,4-tetracarboxylic dianhydride (DMCBDA), 1,2,3,4-butane tetracarboxylic dianhydride (BT-100), 3,3',4,4'-diphenyl sulfone tetracarboxylic dianhydride, 1,2,4,5-cyclohexane tetracarboxylic dianhydride, 1,2,3,4-cyclopentane tetracarboxylic dianhydride, diethylene triamine penta acetic dianhydride or 1,2,3,4-cyclobutanetetracarboxylic dianhydride.

3. The analysis method for dianhydride according to claim 1, wherein the detector is a photodiode array detector in the case of the presence of chromophores and the detector is a charged aerosol detector in the case of the absence of chromophores.

4. The analysis method for dianhydride according to claim 1, wherein the dianhydride sample is in the form of a solution comprising the dianhydride dissolved in a solvent.

5. The analysis method for dianhydride according to claim 4, wherein the solvent used for dissolving the dianhydride comprises at least one of anhydrous acetonitrile (ACN), anhydrous dimethylformamide (DMF), acetic anhydride, anhydrous acetone, anhydrous benzene, anhydrous carbon tetrachloride, anhydrous cyclohexane, anhydrous cyclopentane, anhydrous dichloroethane, anhydrous dichloromethane, anhydrous dimethyl sulfoxide, anhydrous dioxane, anhydrous ethyl acetate, anhydrous diethyl ether, anhydrous methanol, anhydrous methyl ethyl ketone, anhydrous tetrachloroethane, anhydrous tetrahydrofuran, anhydrous toluene or anhydrous trichloroethane.

\* \* \* \* \*